3,288,412
DISPLAY DEVICE

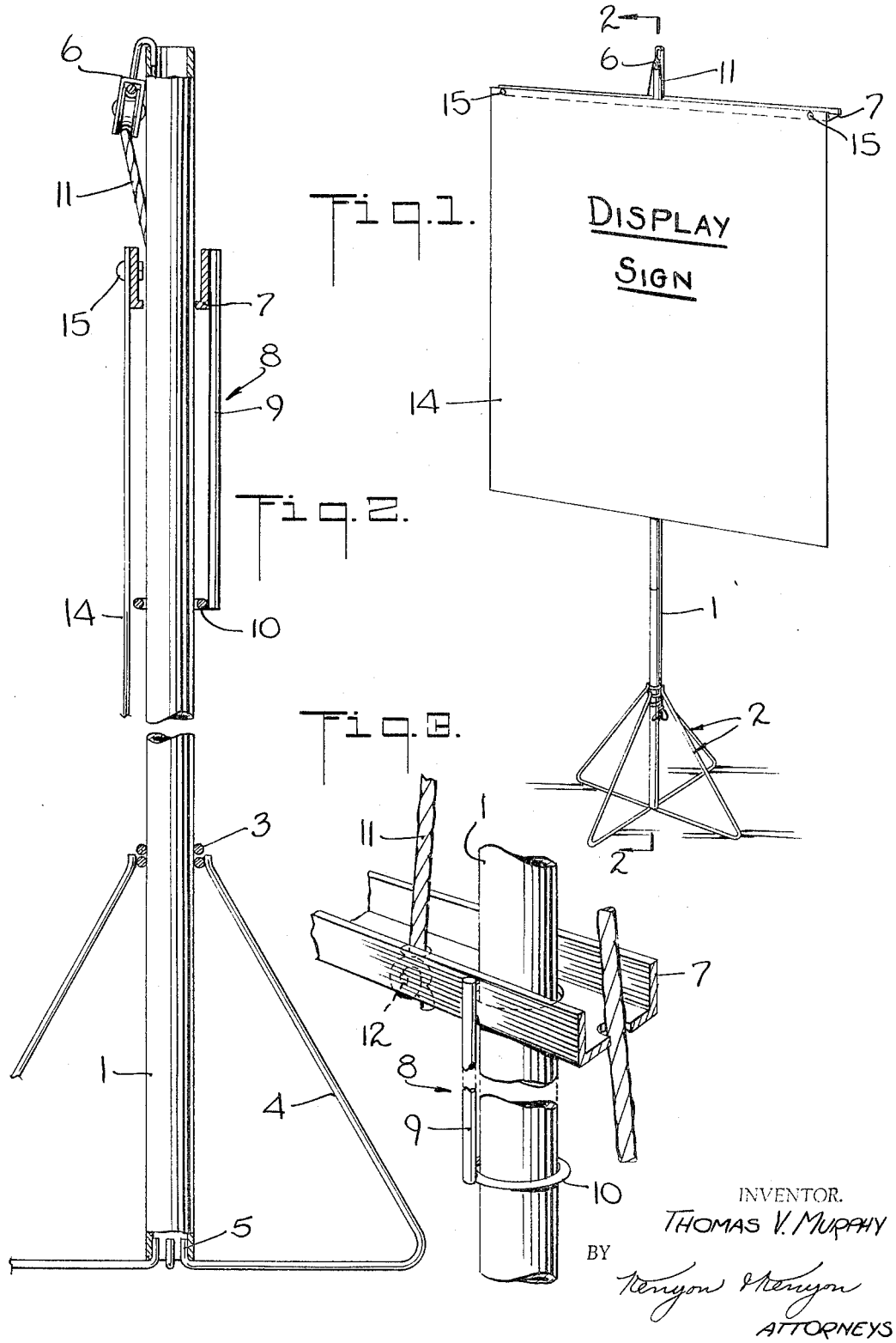

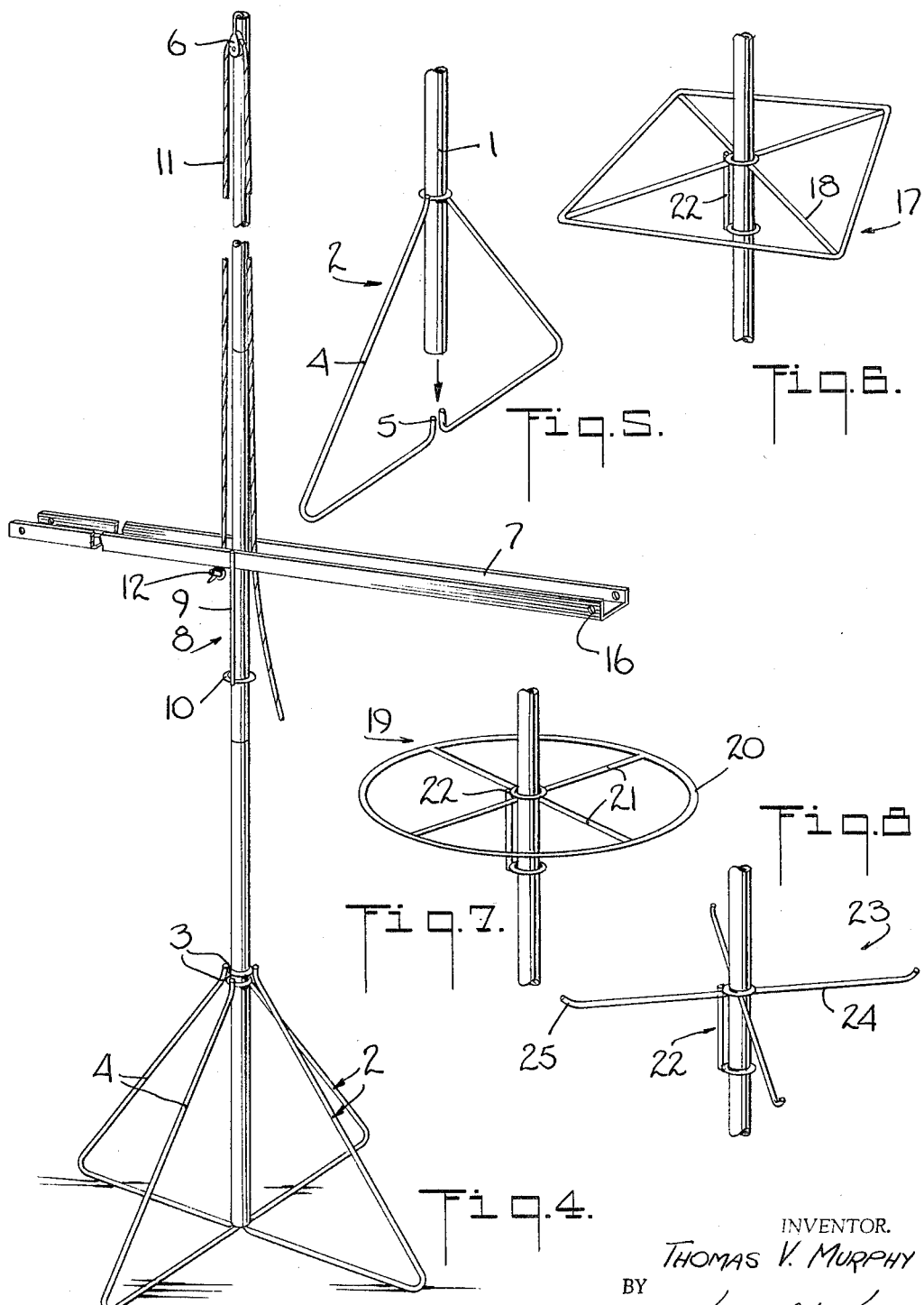

Thomas V. Murphy, Yorktown Heights, N.Y., assignor to Snyder & Black & Schlegel, White Plains, N.Y., a corporation of New York
Filed Nov. 12, 1964, Ser. No. 410,515
5 Claims. (Cl. 248—125)

This invention relates to a display device. It relates particularly to a display device having a horizontal display holder which can be vertically adjusted to any desired height within the limits of the device. More particularly, this invention relates to a vertically adjustable display device which is capable of being self-supported.

There has existed, heretofore, a number of objectionable features in display devices. That is, it has never before been possible to conveniently set up display material at the point-of-purchase to any great height. Further, it has never before been possible to set up display material on a display device which is easily assembled and capable of being self-supported.

Many of the prior display devices, in order to achieve a great height had to be preassembled before they could be installed at the points-of-purchase. Others had to be assembled in a piece-meal operation by telescoping the vertical support members together after having placed the display material on the top-most support member.

Many of the prior display devices, in order to be properly supported at the points-of-purchase, had to be attached to fixed shelving or large display cases. Others had to engage both floor and ceiling for sufficient support. Still others had to be supported from a ceiling by a number of wires.

These objectionable features have unnecessarily limited the placement of material for display purposes and the height to which it could be set. They have also limited the type of material which could be displayed.

Accordingly, it is an object of this invention to provide a display device which will permit the setting up of display material to a great height.

It is another object of this invention to provide a display device which will permit vertical adjustment of the height to which display material is set.

It is another object of this invention to provide a display device which will provide a secure horizontal support means for display material.

It is another object of this invention to provide a display device which is self-supporting.

It is another object of this invention to provide a display device which can be easily assembled.

It is another object of this invention to provide a display device which can be moved from place to place after being assembled.

Other objects and features of the invention will appear in the description and drawings of the invention as described.

FIG. 1 is a front isometric view of an assembled display device;

FIG. 2 is a side elevation view of the display device taken through section 2—2 of FIG. 1;

FIG. 3 is a sectional isometric view of the horizontal support member and its related guide bracket;

FIG. 4 is an isometric view of a display device without any display material;

FIG. 5 is a sectional isometric view of a pole support member and pole, and

FIGS. 6, 7 and 8 are views of other horizontal support embodiments which may be used in the display device.

Referring to FIGURE 2, a side view is shown of a display device. Pole 1 which may comprise a plurality of telescoped sections or a number of sections each having ends which receive or are received in another section and which may be hollow or simply recessed at their ends, is supported in an upright or vertical manner by pole support members 2. Each pole support member is secured at its upper end to a ring 3 which encircles the pole and is comprised of a leg 4 which extends outwardly and downwardly to the plane of the base of the pole and then inwardly terminating with upturned ends 5 received within the base of pole 1. Mounted at the top of the pole 1 is a pulley 6. Mounted intermediate the ends of the pole 1 is a horizontal support member 7. The horizontal support member 7 comprises a channel-shaped member which encompasses the pole 1 and is guided thereon by means of a guide bracket 8 which is comprised of a vertical bar 9 attached at its top end to the horizontal support member 7 and is attached at its bottom end to an annular guide ring 10 which encircles the pole 1. The horizontal support member 7 is vertically adjusted by a rope 11 which passes through the horizontal support member 7 at 12, extends through the pulley 6 and again passes through the horizontal support member 7 at 13. One end of the rope 11 is knotted at 12 to support the horizontal support member 7 and the other end is tied to the pole 1 and pole support member 2. A display sign 14 is shown attached to horizontal member 7 by means of bolts 15 passing through openings 16. Of course, other attaching means may be used within the scope of this invention.

In use, the pole 1 is passed through the horizontal support member 7 and guide bracket 8, the pole 1 is then mounted on its support members 2 one at a time, as best indicated in FIGURE 5. Next, the pulley 6 and rope 11 are mounted on the pole 1 and passed through the horizontal support member 2 to be tied at each end appropriately so as to secure the horizontal support member 2 in position on the pole 1. The display device is now assembled. A display sign 14 of the type illustrated in FIGURE 1 may be mounted by bolts 15 on the horizontal support member 7 and thence adjusted to any desired height within the limits of the pole 1. The overall height of the pole 1 is normally in the range of from eight feet to fifteen feet. However, other extreme heights may be obtained depending on the materials used and displayed.

As shown in FIGURES 6, 7 and 8, other shapes may be imparted to the horizontal support member. FIGURE 6 illustrates horizontal support member 17 of square shape which comprises a plurality of bars 18 connected together to a guide bracket 22 similar to the guide bracket 8 described above. FIGURE 7 illustrates a horizontal support member 19 of circular shape which comprises an annular member 20 connected by a plurality of bars 21 to a guide bracket 22. FIGURE 8 illustrates a horizontal support member 23 of X-shape which comprises a plurality of bars 24 each connected to a guide bracket 22 at one end thereof and having an upturned end 25 at the other end. Other shapes may be used in forming the horizontal support member and they may have an open or closed support surface depending on the material to be displayed, e.g. boxes.

Further, a plurality of horizontal support members may be mounted on a single pole by means of one rope and pulley or a plurality of ropes and pulleys or any combination thereof. Also, a horizontal member may be attached to the pole 1 and be adapted to engage the bottom edge of a display sign in order to prevent it from curling or from being moved away from the pole 1.

While specific embodiments of this invention have been described, variations within the scope of the appended claims are possible and are contemplated. There is no intention, therefore, of limiting this invention to the exact details described herein.

What is claimed is:

1. A transportable self-supporting display device comprising a horizontally disposed elongated display support means for supporting a display thereon, said display support having an opening through the center thereof, a vertical support means slidably disposed in the opening of said display support means, a guide bracket for guiding said display support means on said vertical support means, said guide bracket including an annular guide ring spaced from said display support means and encircling said vertical support means and a vertical bar connected at one end to said annular guide ring and at the other end to said display support means, and means mounted on said vertical support means and connected to said display support means for vertically adjusting said display support means on said vertical support means.

2. A display device as set forth in claim 1 wherein said vertical support means includes a plurality of elongated telescoped sections disposed in vertical manner.

3. A display device as set forth in claim 1 further comprising support members attached to said vertical support means to support said vertical support means in an upright manner, each of said support members including leg means attached at an upper end thereof to said vertical support means and extending downward and outwardly of said vertical support means at least to the plane of the base end of said vertical support means.

4. A display device according to claim 3, wherein said means for vertically adjusting said display support means includes a pulley mounted on said vertical support and a rope attached at one end to said display support means and releasably attached at the other end to said vertical support means, said rope passing through said pulley intermediate its ends, whereby said display support means is adapted to be adjusted vertically.

5. A display device according to claim 1 wherein said display support means is channeled-shaped.

References Cited by the Examiner

UNITED STATES PATENTS

| | | | |
|---|---|---|---|
| 1,006,834 | 10/1911 | Edwards | 248—125 X |
| 1,247,195 | 11/1917 | Willett | 211—78 |
| 2,522,223 | 9/1950 | Hardin et al. | 248—124 |
| 2,701,928 | 2/1955 | Keeman et al. | 40—125 |
| 2,919,878 | 1/1960 | Nathan | 248—188 X |

CLAUDE A. LE ROY, *Primary Examiner.*

JOHN PETO, *Examiner.*